United States Patent [19]
Ryoo et al.

[11] Patent Number: 5,552,904
[45] Date of Patent: Sep. 3, 1996

[54] COLOR CORRECTION METHOD AND APPARATUS USING ADAPTIVE REGION SEPARATION

[75] Inventors: Sung-geol Ryoo, Kunpo; Yang-seock Seo, Seoul, both of Rep. of Korea

[73] Assignee: Samsung Electronics Co., Ltd., Kyungki-do, Rep. of Korea

[21] Appl. No.: 313,817

[22] Filed: Sep. 28, 1994

[30] Foreign Application Priority Data

Jan. 31, 1994 [KR] Rep. of Korea ..................... 94-1751

[51] Int. Cl.⁶ .................. H04N 1/56; H04N 1/60
[52] U.S. Cl. .................. 358/518; 358/519; 358/523; 348/675
[58] Field of Search .................. 358/518, 520, 358/523, 519, 521; 382/167; 348/651, 655, 661, 675, 679

[56] References Cited

U.S. PATENT DOCUMENTS 4,929,978 5/1990 Kanamori et al. ..................... 358/520
5,448,380 9/1995 Park ..................... 358/518

OTHER PUBLICATIONS

Miyake et al., "Facial Pattern Detection and Color Correction from Television Picture for Newspaper Printing", Image Science and Technology, 1990.

Miyake et al., "A New Method for Color Correction in Hardcopy from CRT Images", Image Science and Technology, vol. 37–1, pp. 30–36, 1993.

Primary Examiner—Scott A. Rogers
Attorney, Agent, or Firm—Leydig, Voit & Mayer

[57] ABSTRACT

The present invention relates to a color correction method for dividing a color space and producing a color correction coefficient for respective regions. The method comprises the steps of receiving image data, discriminating a region to which the input data pertains and selecting a color correction coefficient in accordance with the region so as to produce the selected one, performing color correction by operating the selected color correction coefficient and the input data, and outputting the color-corrected image data.

6 Claims, 6 Drawing Sheets

| A |
|---|
| NUMBER OF APPLICATION-IMPOSSIBLE INDICATIONS |

B

| REGION NUMBER | TAG | COLOR CORRECTION COEFFICIENT |
|---|---|---|
| 1 | 0 | |
| 2 | 1 | |
| ⋮ | ⋮ | ⋮ |
| K | 0 | |

C

| REGION NUMBER | TAG | COLOR CORRECTION COEFFICIENT |
|---|---|---|
| 2-1 | 0 | |
| 2-2 | 0 | |
| ⋮ | ⋮ | ⋮ |
| 2-m | 0 | |

COLOR CORRECTION METHOD AND APPARATUS USING ADAPTIVE REGION SEPARATION

BACKGROUND OF THE INVENTION

The present invention relates to a color correction method and apparatus for faithfully reproducing the original color image in a color reproduction system, and more particularly, to a color correction method and apparatus in which a color space is adaptively divided and color compensation coefficients are produced with respect to the division of the color space.

Recently, a significant difference in color reproduction among systems of using various media has come to light. If we compare an original image which may be picked up by a scanner or shown through a monitor with a reproduction image which may be obtained by printing, a considerable difference between the original and reproduced images emerges. This is primarily due to a difference in the respective color reproduction methods, such that monitors and scanners typically adopt an additive color system while printers typically use a subtractive color system. In addition, a difference between the original image and the reproduction image can originate from the different color gamuts of the color reproduction apparatuses. For reducing this color difference, a color transformation according to the input color gamut is performed for printing.

Generally, in a color correction method, the Beer-Lambert and Neugebauer equations have been proposed in order to estimate color reproduction by using analytic modeling. These equations, however, have a disadvantage in that they cannot truly compensate a non-linearity of the apparatus used which occurs in practice.

On the other hand, an empirical method, whereby a color reproduction process is accomplished within a "black box" and a correlation between the input and output thereof is observed, is widely used in color correction. As such, there are a method using a multiple regression analysis and a method using a look-up table. Though the former method, in which input and output data are processed statistically to be represented by an optimal input/output relationship, is widely used in recent times, it has a drawback in that it is not applicable to all color gamuts. In addition, the latter method can perform a reliable color correction for gamut colors due to the usage of the look-up table data sampled in every gamut color, but it has a disadvantage in that it requires numerous measuring colors and a detailed interpolation method for its accuracy and must have ample memory for storing the complete look-up table.

On the other hand, in the conventional color conversion method, a color transform matrix in the form of 3×3, 3×6 and 3×9 is obtained from the relationship between RGB input and RGB output using a multiple regression analysis. The original image is multiplied by the obtained color transform matrix. However, because the relationship between the input RGB space and the output RGB space is nonlinear and non-uniform, a color correction using only one color transform matrix leads to a deficient result. For solving this problem, Y. Miyake et. al have disclosed a paper entitled "Facial Pattern Detection and Color Correction from Television Picture for Newspaper Printing" (*Image Science and Technology*, 1990). In this paper, when a television image is reproduced by a newspaper printing system, the correction is made such that an input RGB space is divided into flesh tones and other colors in order to implement realistic flesh color, and a color transform matrix is obtained from the relationship between the RGB input and output for each color category using a multiple regression analysis.

Also, in another paper by Y. Miyake et. al ("A New Method for Color Correction in Hardcopy from CRT Images," *Image Science and Technology*, Vol. 37-1, pp 30–36, 1993), color correction is made such that an input color space is divided into five categories: flesh tones, gray, red, green and blue. In other words, the RGB coordinates are first projected onto a three-dimension plane based on the following equations (1)

$$r = \frac{R}{R+G+B}$$

$$g = \frac{G}{R+G+B} \qquad \text{equation (1)}$$

$$b = \frac{B}{R+G+B}$$

In addition, provided that p and q represent the coordinates of this plane for identifying a color position, p and q can be obtained from the coordinates according to the following equation (2)

$$\begin{bmatrix} p \\ q \end{bmatrix} = \begin{bmatrix} \frac{1}{\sqrt{2}} & \frac{1}{\sqrt{2}} & 0 \\ \frac{1}{\sqrt{6}} & \frac{1}{\sqrt{6}} & \frac{2}{\sqrt{6}} \end{bmatrix} \begin{bmatrix} r \\ g \\ b \end{bmatrix} \qquad \text{equation (2)}$$

This conventional color correction method, in which flesh tones, gray, red, green and blue are equally divided and processed as described above, is difficult for showing accurately the output characteristics of a printer because the division is not suitable for the RGB space characteristics. This leads to a problem in that numerous errors are included in the color transform matrix itself, as obtained from the respective gamut levels.

SUMMARY OF THE INVENTION

Accordingly, the object of the present invention is to provide a method for producing color correction coefficients constituting an accurate color transform matrix by adaptively dividing an RGB space in accordance with the characteristics of a color reproduction system.

Another object of the present invention is to provide a color correction method for improving the processing speed and fidelity of a color reproduction system by using the color correction coefficients obtained in accordance with the above object.

Still another object of the present invention is to provide a color correction apparatus which can perform the color correction method according to the second object.

To attain the first object, there is provided a method according to the present invention, in which an RGB space is divided into predetermined regions in accordance with a characteristic of a color reproduction system and a color correction coefficient is produced for constituting a color transform matrix with respect to the divided regions, comprising the steps of: uniformly dividing the RGB space so as to produce patches and performing color-estimation on the produced patches in a linear color space to produce an RGB output; constituting a look-up table by detecting an RGB input corresponding to the RGB output using a reverse transformation equation while keeping the produced RGB output uniform; inputting an allowed error range in order to obtain a color correction coefficient compatible with the correctness required by the system; and adaptively dividing the RGB space so that the error of the color correction coefficient is within the allowed error range, and producing color correction coefficients and corresponding region numbers for the respective divided regions.

To attain the second object, there is provided a method according to the present invention, for dividing an RGB space into predetermined regions in accordance with a characteristic of a color reproducing system, producing a color correction coefficient with regard to respective regions and then performing color correction to input image data in accordance with its corresponding color correction coefficient, comprising the steps of: receiving image data; discriminating a region to which the received data pertains, so as to select a color correction coefficient corresponding to the region; color-correcting by operating on the selected color correction coefficient and the received data; and outputting the color-corrected image data.

To attain the third object, there is provided an apparatus according to the present invention, for dividing an RGB space into predetermined regions in accordance with a characteristic of a color reproducing system, producing a color correction coefficient with regard to respective regions and then performing color correction to input image data in accordance with its corresponding color correction coefficient, comprising: region discriminating means for receiving image data and discriminating its corresponding region; a look-up table in which a plurality of color correction coefficients are stored, for producing a specific color correction coefficient in accordance with the output of the region discriminating means; and operating means for performing color correction by multiplying the image data with the output of the look-up table.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

First, for the convenience of the explanation, the terms appearing in this specification will be defined as follows. A color space (or RGB space) is a color coordinate space, the three axes of which are constituted by red, green and blue (the three primary colors of an additive coloring system). A pixel position is determined in accordance with its red, green and blue levels. A category is a divided color space in accordance with specific criteria. An adaptive-type region (or adaptively divided region) is a region whose size varies, because a region is optimally divided in accordance with the characteristics of the color space with its size difference being controlled within an allowed error range. A divided region is assigned a unique region number, and each region number is coupled with a tag during the process for producing color correction coefficients. Here, a tag indicates whether the error of color correction coefficient produced with respect to the corresponding region number is within the allowed error range or whether it deviates from the allowed error range. In one embodiment of the present invention, if the error of the color correction coefficient is within the allowed error range, the tag has an application-possible value (represented as "0") and if the error of the color correction coefficient deviates from the allowed error range, the tag has an application-impossible value (represented as "1"). An RGB input is image data to be corrected, or a color space including the input image data. An RGB output is output data obtained by correcting the input image data, or a color space including the output data. An RGBc signal is an RGB input obtained by reversely applying the color correction coefficients to the RGB output. The relationship between the RGB input and output signals is defined by a color transform matrix.

In the present invention, a color space is divided into adaptive type regions, and a color transform matrix is produced with respect to each divided region. The color transform matrix is implemented by a look-up table such that input image data is color-corrected by the corresponding color transform matrix. Therefore, for performing color correction according to the present invention, a color transform matrix (that is, the coefficients thereof; also called "color correction coefficients") should be calculated for each region, in a pre-processing step.

Figure 1:
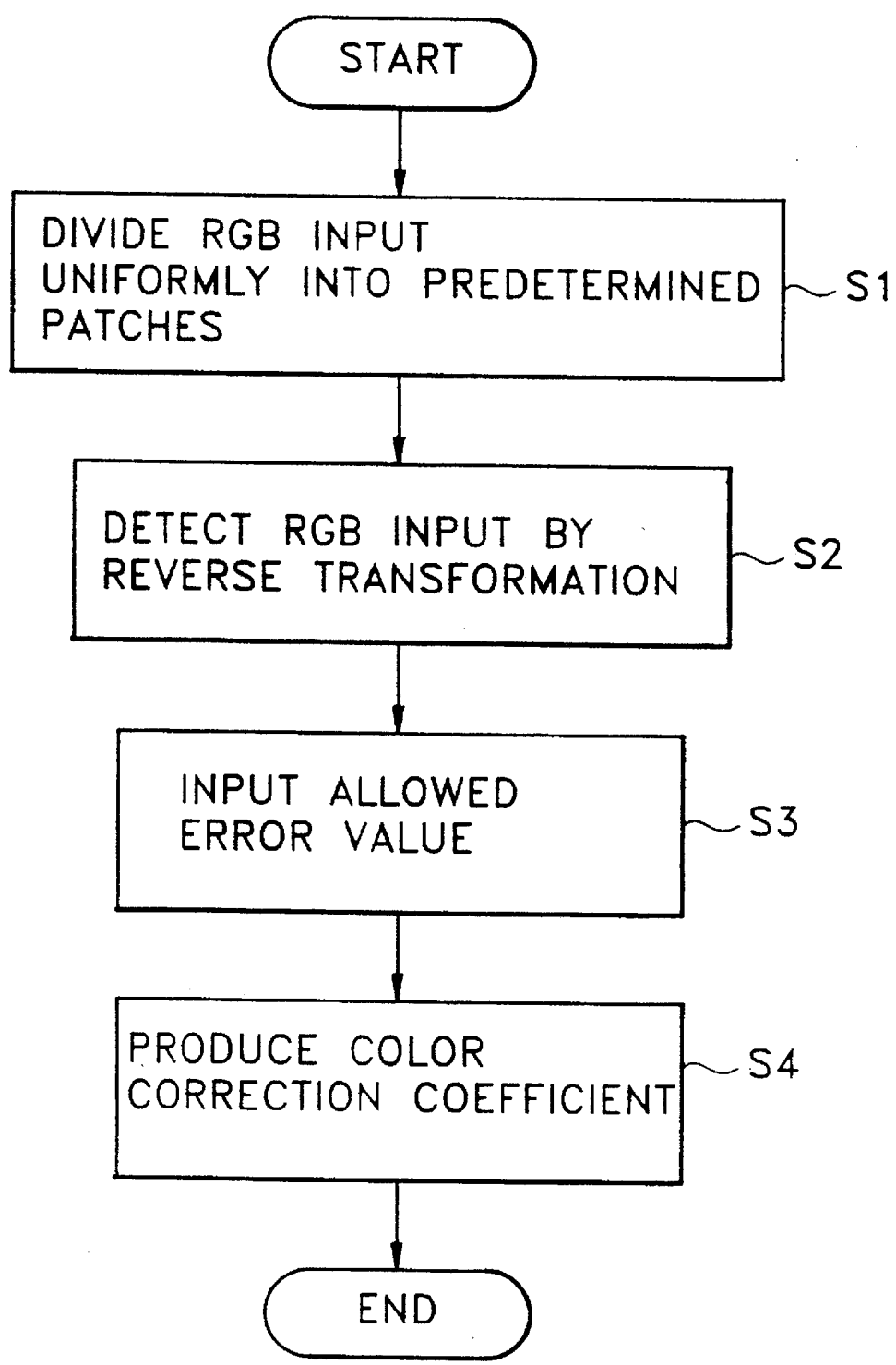
FIG. 1 is a flow chart illustrating the process for obtaining color correction coefficients according to the present invention.

FIG. 1 is a flow chart illustrating the process for obtaining color correction coefficients according to the present invention.

Referring to FIG. 1, in step S1, the RGB input is equally divided into a predetermined number of patches so as to be output, and the output patches are measured by CIE1976 L*a*b. Then, an RGB output is produced from the value measured by the CIE1976 L*a*b in accordance with an NTSC RGB transform equation. In other words, in step S1, each RGB space is equally divided while its predetermined value is incremented and then patches are printed. Each printed patch is color estimated in a linear color space (that is, an CIE1976 L*a*b or CIE XYZ coordinate system). Subsequently, the color-estimated value is reversely applied with the NTSC-RGB transform equation, so as to produce an RGB output.

In step S2, the relationship of the uniform RGB input and the non-uniform RGB output is made into a table representing the relationship of the uniform RGB output and the nonuniform RGB input, using reverse transformation and gamut mapping. In other words, in step S2, an RGB input and output pair obtained in step S1 is processed with reference to the color-estimated value by CIE1976 L*a*b for convenient color correction. While the RGB input obtained in step S1 is the value which is uniformly divided by a predetermined interval, the RGB output which is reversely calculated after color-estimation has an irregular value. This is because the output characteristics of a printer is nonlinear with respect to its input. Accordingly, for obtaining a desired output color in a printer, the input color value (RGBin) corresponding to the desired output color should be known. The input color corresponding to the desired output color is calculated using a reverse transform with reference to the color-estimated value by CIE1976 L*a*b and a gamut mapping, and then it is stored in a table to be used for producing color correction coefficients.

Step S3 is for receiving an allowed error value to be used for discriminating whether the application of the color correction coefficients obtained from the uniform RGB output and non-uniform RGB input pair produced in step S1 is permissible. That is, in step S3, an allowed error value is applied from a color reproduction system in order to discriminate whether the produced color correction coefficients can be applied. Here, the error value (δRGB) of color correction coefficients is the difference between the RGB value (RGBc) and the input color (RGBin), in which the RGB value (RGBc) is calculated by reversely applying color correction coefficients obtained using the desired output color (RGBout) and the input color (RGBin) to the desired output color (RGBout). The error value (δRGB) of color correction coefficients can be obtained by the following equation (3).

$$\delta RGB = \sqrt{(R_{in} - R_c)^2 + (G_{in} - G_c)^2 + (B_{in} - B_c)^2} \quad \text{equation (3)}$$

Here, $R_{in}$ is the input value in the R-axis of the color space, and $R_c$ is the calculated value in the R-axis of the color space. $G_{in}$ is the input value in the G-axis of the color space, and $G_c$ is the calculated value in the G-axis of the color space. $B_{in}$ is the input value in the B-axis of the color space, and $B_c$ is the calculated value in the B-axis of the color space.

On the other hand, the stronger the nonlinearity of the region to which color correction coefficients are calculated with respect is, the higher the error value (δRGB) is. If the allowed error range is increased, the number of the divided regions is decreased so as to reduce the memory required for storing the color correction coefficients but accurate color correction is difficult. To the contrary, if the allowed error range is reduced, the number of the divided regions is increased so as to increase the memory required but accurate color correction can be implemented.

In step S4, color correction coefficients are produced with respect to respectively divided regions. That is, step S4 is for dividing the uniform RGB output obtained in step S2 into k regions and detecting sample colors (the RGB output included in the regions and the RGB input corresponding thereto) in the respective regions, so as to produce color correction coefficients.

Figure 2:
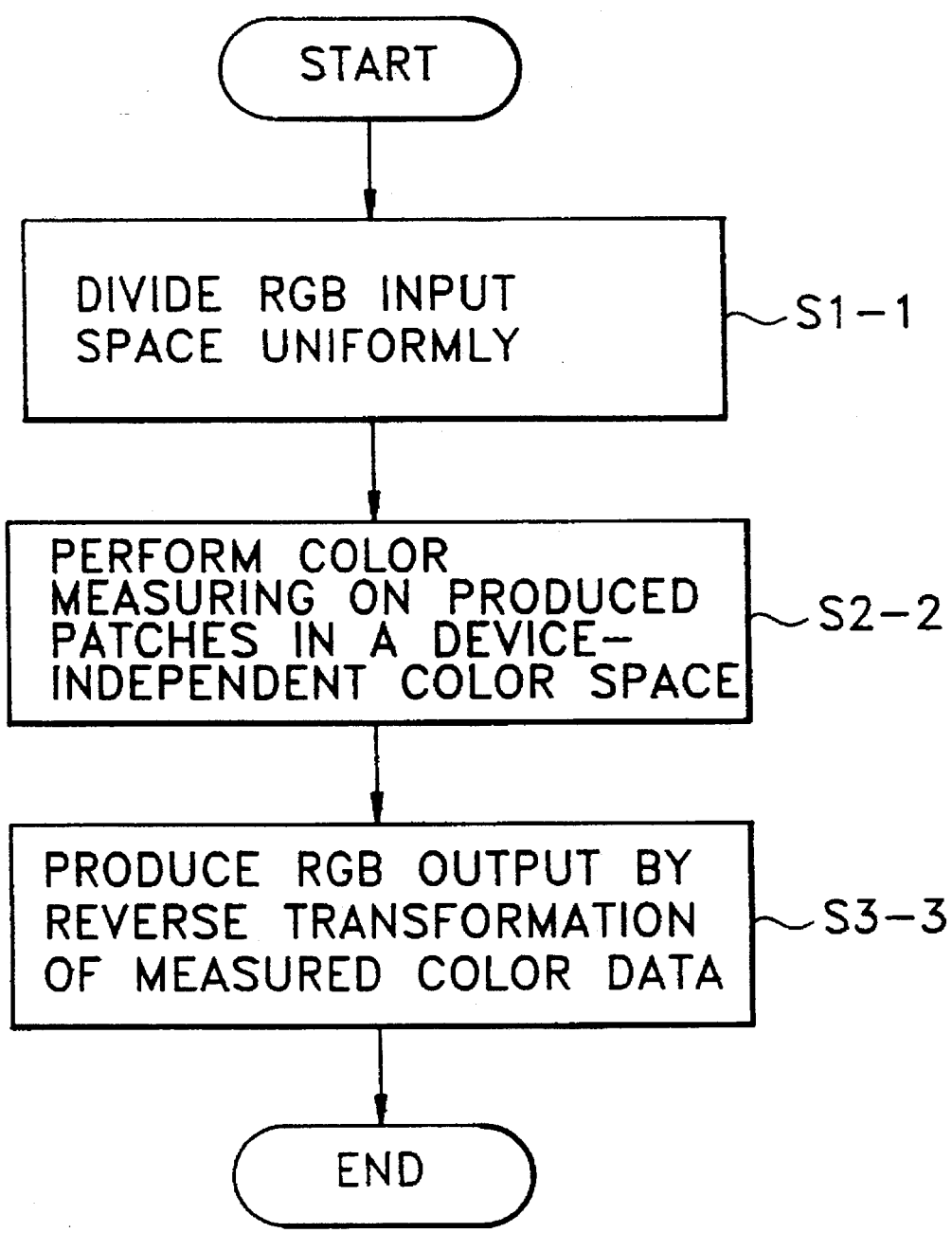
FIG. 2 is a detailed flow chart illustrating the process (S1) for producing "RGBout" as shown in FIG. 1.

FIG. 2 is a detailed flow chart illustrating a process (step S1) for producing the RGB output shown in FIG. 1. This process includes a step S1-1 in which RGB input space is uniformly divided and then patches are printed, a step S1-2 in which the printed patches are color-estimated in a linear color space, and a step S1-3 in which the color-estimated data is reversely transformed so as to produce an RGB output.

In FIG. 2, in patch output step S1-1, the RGB input is uniformly divided by a computer so as to produce and then print patches. For example, if an RGB input is divided such that R=0, 15, 30 . . . , 255; G=0, 15, 30 . . . , 255; and B=0, 15, 30 . . . , 255, the number of patches is 4,913 (equal to the result of 17*17*17).

In color-estimation step S1-2, each patch output is assigned to the value of a linear color space such as CIE XYZ or CIE1976 L*a*b, so as to be color-estimated using a color estimator.

In RGB output producing step S1-3, the RGB output is calculated from the color-estimated CIE XYZ or CIE1976 L*a*b using an NTSC RGB transform equation, which is the RGB value output from a printer. For producing such an RGB value, the RGB input should be applied to the printer. As described above, in step S1, the RGB output corresponding to the RGB input used when a patch is being made according to the above process is produced by color-estimating and NTSC RGB transformation.

Figure 3:
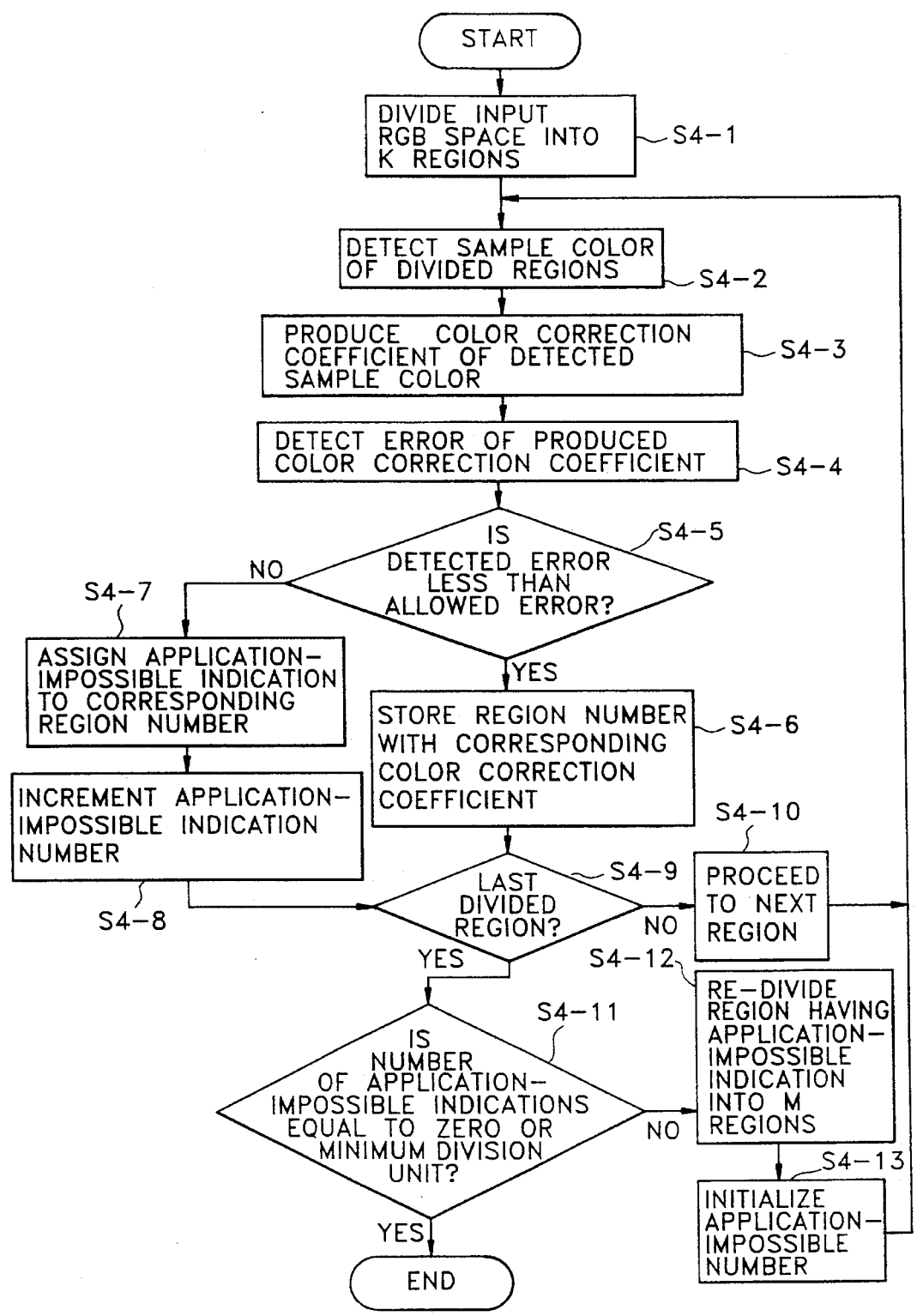
FIG. 3 is a detailed flow chart illustrating the process (S4) for producing color correction coefficients as shown in FIG. 1.

FIG. 3 is a detailed flow chart illustrating a process (step S4) for producing color correction coefficients for respective gamuts shown in FIG. 1.

In FIG. 3, in step S4-1 the entire RGB space is divided into k regions. Step S4-2 is for detecting specific samples for respectively divided regions from the table obtained in step S2 of FIG. 1. In step S4-3, color correction coefficients are produced from the detected samples using multiple regression analysis. The error of the detected color correction coefficients is detected in step S4-4. In steps S4-5 and S4-6, if the detected error is lower than the allowed error, the region number is stored along with its corresponding color correction coefficient. In steps S4-5, S4-7 and S4-8, if the detected error is higher than the allowed error, an "application-impossible" indication is assigned to the tag corresponding to the region number. In steps S4-9 to S4-13, after steps S4-2 through S4-8 are performed with regard to the divided region of step S4-1, the region to which the "application-impossible" indication has been assigned is re-divided into m smaller regions. With respect to the region to which the "application-impossible" indication is not assigned, steps S4-2 through S4-8) should be recursively performed until the divided region is a minimum division unit. Therefore, the region number of the divided region along with color correction coefficients corresponding thereto are produced.

Subsequently, the operation of step S4 will be explained with reference to the example described below.

First, the entire RGB space is uniformly divided by two levels for respective R, G and B into a total of eight large regions (S4-1). Using the table obtained in step S2 of FIG. 1, color correction coefficients are produced using multiple regression analysis from the RGB output and RGB input pair, with the RGB output of the center of respective divided regions being the reference (steps S4-2 and S4-3). Subsequently, the RGBc value is calculated by multiplying the color correction coefficients with the RGB output, and the calculated RGBc value is compared with the RGB input so as to produce the error (δRGB) according to Equation 3 (step S4-4).

If the calculated error (δRGB) is equal to or lower than the input allowed error, the current region number and the color correction coefficients are stored (step S4-6). Next, the current region is checked to determine whether it is the last region (step S4-9), and if not, the process proceeds to the next region (step S4-10). When the calculated error (δRGB) is higher than the allowed error, the color correction coefficients obtained in the region cannot be applied, so an "application-impossible" indication (represented by a ÷1") is assigned to the region number (step S4-7) and the number of "application-impossible" indications is incremented by one (step S4-8).

After the entire region is processed as above, if no "application-impossible" region exists or if the divided region is equal to the predetermined minimum unit (steps S4-S11), the process is finished. Otherwise, the region indicated as being "application-impossible" is re-divided into smaller regions (steps S4-S12). Next, the "application-impossible" indication number is initialized as "0" (steps S4-S13) and the process is repeated from step S4-2 for detecting the sample color of the first region.

Figures 4, 5:
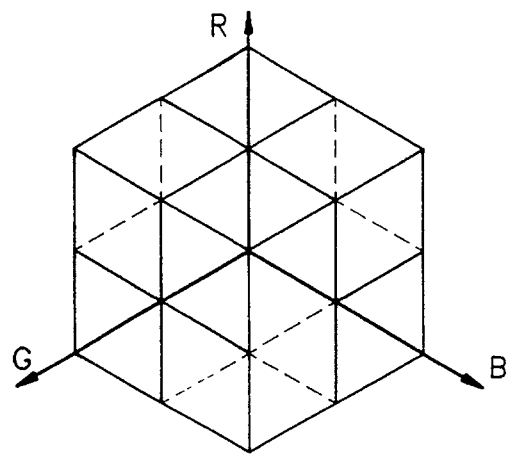
FIG. 4 shows an example of RGB space which is equally divided into eight regions, according to the present invention.
FIG. 5 shows an example of a table used for obtaining color correction coefficients for respective divided regions according to the process of FIG. 3.

FIG. 4 shows an example of RGB space which is equally divided into eight gamut colors, according to the present invention (that is, k=8). Here, each axis (R, G and B) is equally divided into two parts so as to divide the color space into eight regions.

FIG. 5 shows an example of a table which is used for obtaining color correction coefficients for respective divided gamuts according to the process of FIG. 3.

In FIG. 5, "A" is the total number of "application-impossible" indications. Also, "B" is an example of a table including the region number, the tag, and color correction coefficients, which corresponds to the RGB space being divided into k regions as in step S4-1 of FIG. 3. Further, "C" is an example of a table including the region number, the tag, and color correction coefficients, which corresponds to an "application-impossible" region of table B being re-divided into m smaller regions as in step S4-S12 of FIG. 3.

The region number in table B can be 1 to k, and a tag of "0" indicates the "application-possible" condition resulting from the error of the color correction coefficient being within the allowed error. A tag of "1" indicates that the error deviates from the allowed error.

In table C, the second region in table B is re-divided into m regions. Here, the region numbers are from 2-1 to 2-m and the tag indications are the same as in table B.

Hence, the color space is recursively divided until the color correction coefficients are within the allowed error, so as to improve the fidelity of color correction.

Figure 6:
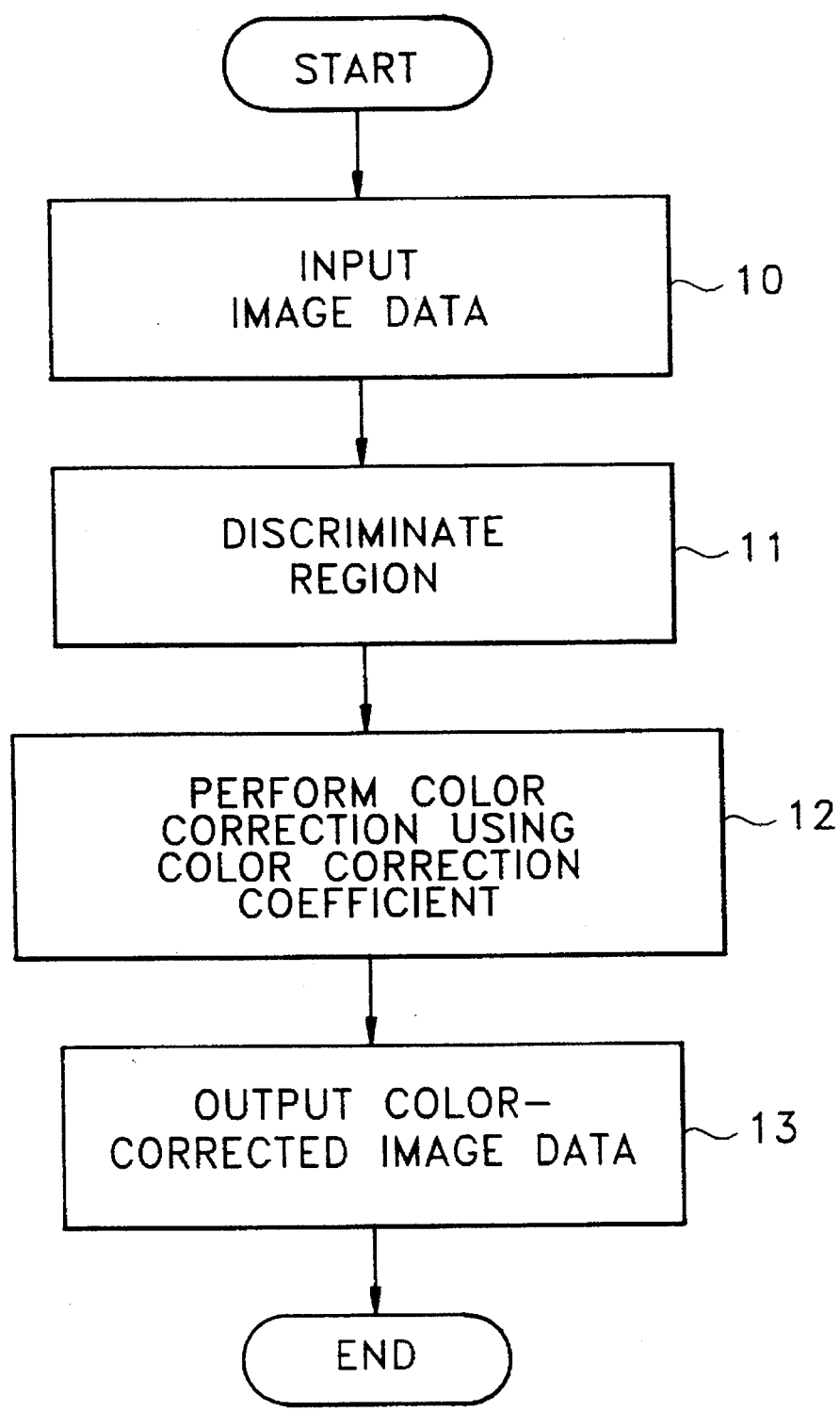
FIG. 6 is a flow chart representing a color correction method according to the present invention.

FIG. 6 is a flow chart representing a color correction method according to the present invention.

The color correction method according to the present invention, includes a step 10 for inputting image data, a step 11 for discriminating the region to which the input data pertains and then selecting the corresponding color correction coefficient according to the region, a step 12 for operating the selected color correction coefficients and the input data so as to perform color correction, and a step 13 for producing color-corrected image data.

In other words, in the color correction method according to the present invention, the color correction coefficient obtained in the process of FIG. 1 is stored in the form of a look-up table, if image data is applied for correction, the region to which the input data pertains is detected, and then a color correction coefficient corresponding to the region is detected. Subsequently, the input image data is corrected using the corresponding color correction coefficient so as to improve the fidelity of color reproduction.

Figure 7:
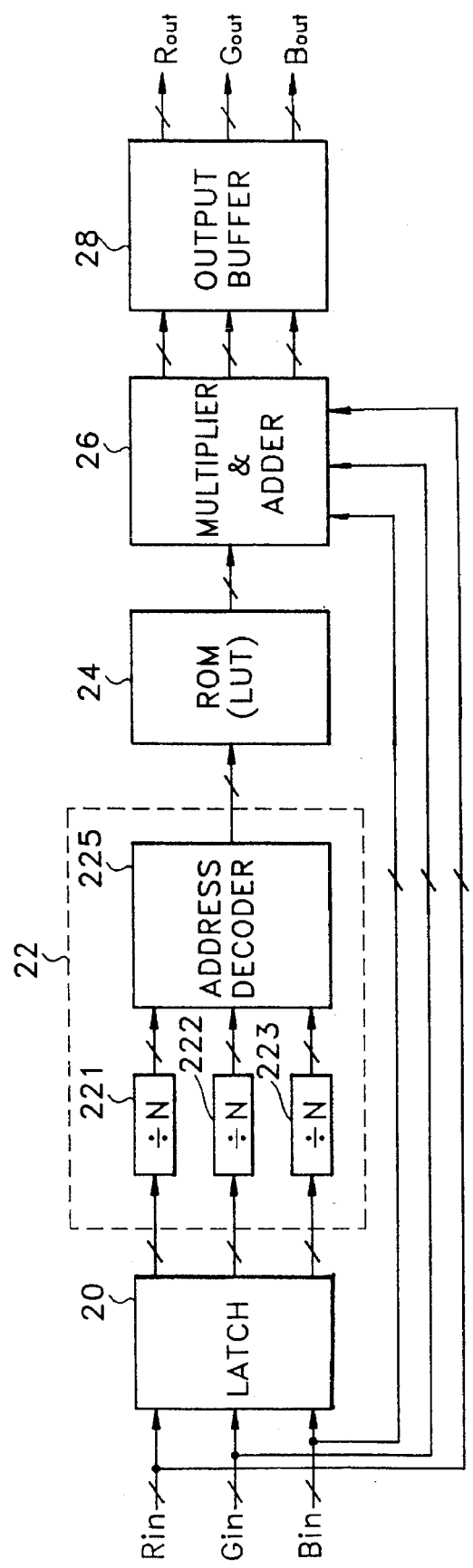
FIG. 7 is a block diagram illustrating a color correction apparatus according to the present invention.

FIG. 7 is a block diagram illustrating a color correction apparatus according to the present invention.

In FIG. 7, the color correction apparatus according to the present invention includes an input unit 20 for latching an image data, a region discriminator 22 for receiving the latched image data and discriminating its corresponding region, a look-up table 24 for selecting a color correction coefficient in accordance with the output of the region discriminator 22 so as to produce the selected one, an operator 26 for multiplying the image data with the output of look-up table 24 and then performing a color compensation by adding, and an output unit 28 for buffering the output of operator 26.

In FIG. 7, input unit 20 is implemented by a latch for latching input data Rin, Gin and Bin, and output unit 28 is an output buffer for outputting the color compensated data Rout, Gout and Bout. Look-up table 24 is a ROM for storing a plurality of color compensating coefficients each of which corresponds to one region obtained by suitably dividing a color space in accordance with the characteristic of a color reproduction system. Region discriminator 22 includes frequency dividers 221–223 each for performing a frequency dividing on the input data by N and an address decoder 225 for decoding the outputs of frequency dividers 221–223 so as to produce the corresponding address. Region discriminator 22 determines the region to which the input data corresponds and then applies an address corresponding to the region to ROM 24 in order for ROM 24 to produce a corresponding coefficient. Operator 26 includes a multiplier and an adder, and performs a color compensation by multiplying the input RGB image data with a color compensating coefficient of the corresponding region and then adding.

As described above, the present invention can be used for producing a hard copy of a monitor image, the printing of a scanner image, color correcting the monitor image, color correcting the scanner image, or color correction of another color apparatus. The color correction according to the present invention is more accurate than that of the conventional method using region dividing. In addition, the present invention reduces the required memory by using a look-up table, which increases operating speed.

What is claimed is:

1. A method for producing a color correction coefficient in which an RGB space is divided into predetermined regions in accordance with a characteristic of a color reproduction system and the color correction coefficient is produced for constituting a color transform matrix with respect to the divided regions, comprising the steps of:

(a) uniformly dividing the RGB space so as to produce patches and performing color-estimation on the produced patches to produce an RGB output;

(b) constituting a look-up table by detecting an RGB input corresponding to the RGB output using a reverse transformation equation, while keeping the RGB output uniform;

(c) inputting an allowed error range in order to obtain a color correction coefficient compatible with the correctness required by said system; and (d) adaptively dividing said RGB space so that the error of said color correction coefficient is within said allowed error range, and producing a color correction coefficient and corresponding region numbers for the respective divided regions.

2. A method for producing a color correction coefficient according to claim 1, wherein said step (a) further comprises:

a printing step for uniformly dividing said RGB input so as to print patches;

a color-estimating step for performing color estimation on each printed patch of a color space; and a calculating step for performing a reverse transform on the color-estimated results so as to calculate an RGB output.

3. A method for producing a color correction coefficient according to claim 1, wherein said step (d) further comprises the substeps of:

(d-1) dividing said RGB space into k regions;

(d-2) detecting a sample color of said divided specific region from said look-up table;

(d-3) producing said color correction coefficient from the detected sample color, using multiple regression analysis;

(d-4) detecting an error of the produced color correction coefficient;

(d-5) storing the region number along with its color correction coefficient, provided that the detected error is lower than the allowed error;

(d-6) assigning an application-impossible indication to the corresponding region number, provided that the detected error is higher than the allowed error; and (d-7) re-dividing the region having said application-impossible indication into m smaller regions, so as to advance to the substep d-2 for recursively processing, after the process from the substep d-2 to the substep d-6 is performed with regard to the regions divided in substep d-1, wherein the dividing is performed until the region has no application-impossible indication or until the size of the region is a minimum division unit so as to produce the divided region number along with its corresponding color correction coefficient.

4. A color correction method for dividing an RGB space into predetermined regions in accordance with a characteristic of a color reproducing system, producing a color correction coefficient with regard to respective regions, and performing color correction on input image data in accordance with a corresponding color correction coefficient, the color correction method comprising the steps of:

inputting the image data into an input unit;

discriminating adaptively divided regions varying in size to which the input image data pertains, wherein the regions are divided in accordance with the characteristic of the RGB space, the sizes of the regions being controlled within an allowed error range;

selecting a color correction coefficient corresponding to the respective regions;

color-correcting by multiplying the selected color correction coefficient by the input image data; and outputting color-corrected image data.

5. A color correcting apparatus for dividing an RGB space into predetermined regions in accordance with a characteristic of a color reproducing system, producing a color correction coefficient with regard to respective regions, and performing color correction on input image data in accordance with a corresponding color correction coefficient, comprising:

adaptively divided region discriminating means for receiving the input image data, discriminating a region corresponding to the input image data, and producing an output;

a look-up table in which a plurality of color correction coefficients are stored for producing a specific color correction coefficient in accordance with the output of said adaptively divided region discriminating means; and operating means for color correction by multiplying the input image data by the specific color correction coefficient extracted from the look-up table.

6. The color correcting apparatus of claim 5 wherein said adaptively divided region discriminating means includes a plurality of frequency dividers for frequency dividing the input image data and an address decoder for decoding the outputs of the plurality of frequency dividers.

* * * * *